Patented Dec. 12, 1950

2,533,754

UNITED STATES PATENT OFFICE 2,533,754

PURIFICATION PROCESS

Seaver A. Ballard, Orinda, and Bradford P. Geyer, Berkeley, Calif., assignors to Shell Development Company, San Francisco, Calif., a corporation of Delaware No Drawing. Application November 4, 1947, Serial No. 784,080

4 Claims. (Cl. 202—57)

This invention relates to a process for purifying organic solutions, and it is particularly directed to a process whereby such solutions may be freed of aldehydric impurities.

For purposes of clarity, the process of this invention will be described in detail only in connection with its application to the purification of alcohols obtained from olefins, an application in which it has special advantages. It will be understood, however, that the same procedure may be applied not only to the purification of alcohols derived from other sources, but also in the treatment of other types of organic solutions. Thus, while the invention will be described as it relates to the purification of ethanol solutions, it may also be practiced with solutions of such other materials as esters, ethers, and the like, which may contain aldehydic impurities of an undesirable nature.

Among the alcohols, ethanol is perhaps the most important member from a commercial standpoint, and many processes for its manufacture have been proposed. One ethanol may in large part be separated from such solutions through the practice of careful fractional distillation procedures, this method of separation seldom yields a product capable of meeting even industrial standards and never produces alcohol of the highest quality. The impurities which industry finds most objectionable are those of a readily oxidizable nature, as the various aldehydes mentioned, and since such impurities are capable of reducing permanganate solutions, it is conventional to specify that the alcohol shall have a stated minimum "permanganate time." The permanganate time of a given alcohol, or alcohol solution, is that required for 50 ml. of the alcohol, at 15 to 16° C., and containing 2 ml. of a 0.02% potassium permanganate solution, to lose its pink permanganate color. The best grades of alcohol which may normally be produced by conventional fractional distillation procedures have a zero permanganate time, and it is desirable that this time be increased to at least 15, and preferably 30, minutes. It is easy to understand why distillation alone is normally ineffective to produce a product of the desired quality when it is realized that as little as 1 P. P. M. of crotonaldehyde or 2 P. P. M. of sorbaldehyde will cause a solution having a permanganate time of 60 minutes to drop to one having a permanganate time of less than 30 minutes. These same impurities are also responsible in large part for imparting a foreign odor to the product even when their concentration is small.

It is, therefore, a general object of this invention to provide an improved process for purifying and refining ethanol solutions. A more particular object is to provide a method whereby aldehydes and other impurities may be removed from ethanol solutions containing such impurities, with the resultant production of an ethanol solution of improved permanganate time and odor. Other objects of the invention will appear from the nature of the following description.

It has been discovered that aldehydic and other impurities present in ethanol solutions may be eliminated and the permanganate time of the solutions improved, by adding caustic, i. e., alkali metal hydroxide, to the solution and then refluxing the same, followed by the step of fractionally distilling the ethanol from the refluxed solution. The ethanol distillate recovered has a permanganate time of at least 15 minutes and possesses a true, unadulterated odor, this contrasting with the zero permanganate time and poor odor normally possessed by solutions obtained by the same fractional distillation methods, but without the addition of caustic.

While any one or more of the various alkali metal hydroxides may comprise the alkali additive supplied the ethanol solution, it is preferred to employ sodium hydroxide or potassium hydroxide for this purpose. In general the addition of from 0.1 to 3% by weight of alkali metal hydroxide proves satisfactory provided that the resulting solution be refluxed for at least ½ hour before being distilled. The amount of alkali required will vary somewhat depending on the concentration of the solution and the time available for refluxing. Those solutions of relatively lower ethanol concentration, as 10–30% ethanol, and those which it is desired to reflux for but a relatively short time, as ½ hour, preferably receive from 0.5 to 3% by weight of caustic. In the preferred practice of this invention, the more concentrated solutions, as those containing at least 75% ethanol, are refluxed for a period of from ½ to 2 hours, while relatively dilute solutions, as those containing from 10 to 30% ethanol, are advantageously refluxed for from 2 to 5 hours. Even with such solutions of relatively low ethanol concentration, however, considerable improvement is effected through use of a reflux period as short as ½ hour, particularly when the amount of alkali metal hydroxide added is at least about 0.5%. In all cases, longer periods of refluxing than those indicated may be used without harmful result, and shorter periods will also prove beneficial.

Following the refluxing step, the alkaline solution is subjected to fractional distillation to recover the alcohol in the impurity-free, and particularly the aldehyde-free, form, or substantially so. In the preferred practice of this invention, the portion of the distillate initially recovered, as the first 1 to 5%, is discarded since this portion contains any acetaldehyde or other light ends which may be present in the solution. Preferably, the latter portion of the distillate is also discarded or recycled for further treatment. By a practice of this method it is possible in all cases to obtain ethanol solutions which are substantially free of aldehydes, and which are characterized by a permanganate time of at least 15 minutes, and by a true odor.

The following examples will illustrate the manner in which the present invention finds application.

*Example I*

An operation was conducted in which ethylene and water were passed through a phosphoric acid catalyst of 68% strength at the rate of 103 pounds of water and 164 pounds of ethylene per hour, the reaction being conducted at a temperature of 281° C. and at a pressure of 1115 p. s. i. g. The resulting product yielded a condensate containing 20.4% by weight ethanol and having a zero permanganate time. To a portion of the crude product so obtained was added 0.4% by weight sodium hydroxide, and the resulting solution was refluxed for 2½ hours at 85 to 90° C. The refluxed product was then fractionally distilled, and the best 80% of the resulting distillate collected. The said distillate had a permanganate time of 15 minutes and a good odor.

For the sake of comparison, another portion of the aforementioned crude product, containing 20.4% by weight ethanol, was fractionally distilled in the same manner as described above, but with the steps of caustic addition and refluxing being omitted. Here the best portion of the distillate which it was possible to obtain still had a zero permanganate time, and the odor of the product was poor.

*Example II*

In this operation, the crude, 20.4% ethanol product described in Example I was admixed with 0.5% by weight sodium hydroxide, and the resulting solution was refluxed at 86 to 88° C. for a period of 5 hours. This material, on being fractionally distilled, and the best 80% of the distillate collected, yielded a solution having a permanganate time of 46 minutes, and with a true, pleasant odor.

*Example III*

There was here employed a solution containing 88.3% by weight ethanol, the same having been derived by fractionally distilling the crude, 20.4% solution described in Example I. This distillate had a zero permanganate time and was characterized by a relatively poor odor.

To this distillate was added 0.73% by weight potassium hydroxide, and the resulting solution was refluxed at 77 to 78° C. for ½ hour. The refluxed solution was then fractionally distilled through a helices-packed column and all of the alcohol except that coming over with the first two or three per cent of the distillate was recovered. This distillate had a permanganate time of 38 minutes, and it possessed a good odor.

*Example IV*

To another portion of the distillate described in the first paragraph of Example III above, was added 1.46% by weight of sodium hydroxide. This solution was refluxed at 77 to 78° C. for one hour, after which the refluxed solution was distilled from a Claisen flask fitted with a Vigreux column. The best portion of the distillate so recovered had a permanganate time of 31 minutes; its odor was good.

The processes described in the foregoing examples are equally effective when applied to solutions of such other materials as methanol, propanol, diethyl ether, methyl ethyl ether, and ethyl acetate, for example.

We claim as our invention:

1. In a method of purifying a crude aqueous, aldehyde-containing ethanol solution having a zero permanganate time, the steps consisting of dissolving from 0.1 to 3% by weight potassium hydroxide in the solution, refluxing the resulting hydroxide-containing solution for a period of at least one-half hour, and recovering a purified ethanol solution as a distillate from the refluxed solution, said purified alcohol solution being characterized by a permanganate time of at least 15 minutes.

2. In a method of purifying a crude aqueous, aldehyde-containing ethanol solution having a zero permanganate time, the steps consisting of dissolving from 0.1 to 3% by weight sodium hydroxide in the solution, refluxing the resulting hydroxide-containing solution for a period of at least one-half hour, and recovering a purified ethanol solution as a distillate from the refluxed solution, said purified alcohol solution being characterized by a permanganate time of at least 15 minutes.

3. In a method of purifying a crude aqueous, aldehyde-containing ethanol solution having a zero permanganate time, the steps consisting of solving from 0.5 to 3% by weight alkali metal hydroxide in the solution, refluxing the resulting hydroxide-containing solution for a period of at least one-half hour, and recovering a purified ethanol solution as a distillate from the refluxed solution, said purified alcohol solution being characterized by a permanganate time of at least 15 minutes.

4. In a method of purifying a crude aqueous, aldehyde-containing ethanol solution having a zero permanganate time, the steps consisting of dissolving from 0.1 to 3% by weight alkali metal hydroxide in the solution, refluxing the resulting hydroxide-containing solution for a period of at least one-half hour, and recovering a purified ethanol solution as a distillate from the refluxed solution, said purified alcohol solution being characterized by a permanganate time of at least 15 minutes.

SEAVER A. BALLARD.
BRADFORD P. GEYER.

REFERENCES CITED

The following references are of record in the file of this patent:

UNITED STATES PATENTS

| Number | Name | Date |
|---|---|---|
| Re. 21,727 | Rodenberg | Feb. 25, 1941 |
| 294,285 | Stelzner | Feb. 26, 1884 |
| 432,198 | Guidnard | July 15, 1890 |
| 2,188,274 | Bump | Jan. 23, 1940 |
| 2,227,485 | Bump | Jan. 7, 1941 |
| 2,429,484 | Peters | Oct. 21, 1947 |
| 2,451,857 | Miskel | Oct. 19, 1948 |

OTHER REFERENCES

"Organic Chemistry," Fuson and Snyder, John Wiley and Sons, Inc., N. Y., 1942, copy in Library of Congress, pp. 73-75.